No. 654,663. Patented July 31, 1900.
W. S. MOODY.
ELECTRIC REGULATING DEVICE.
(Application filed May 21, 1900.)
(No Model.)
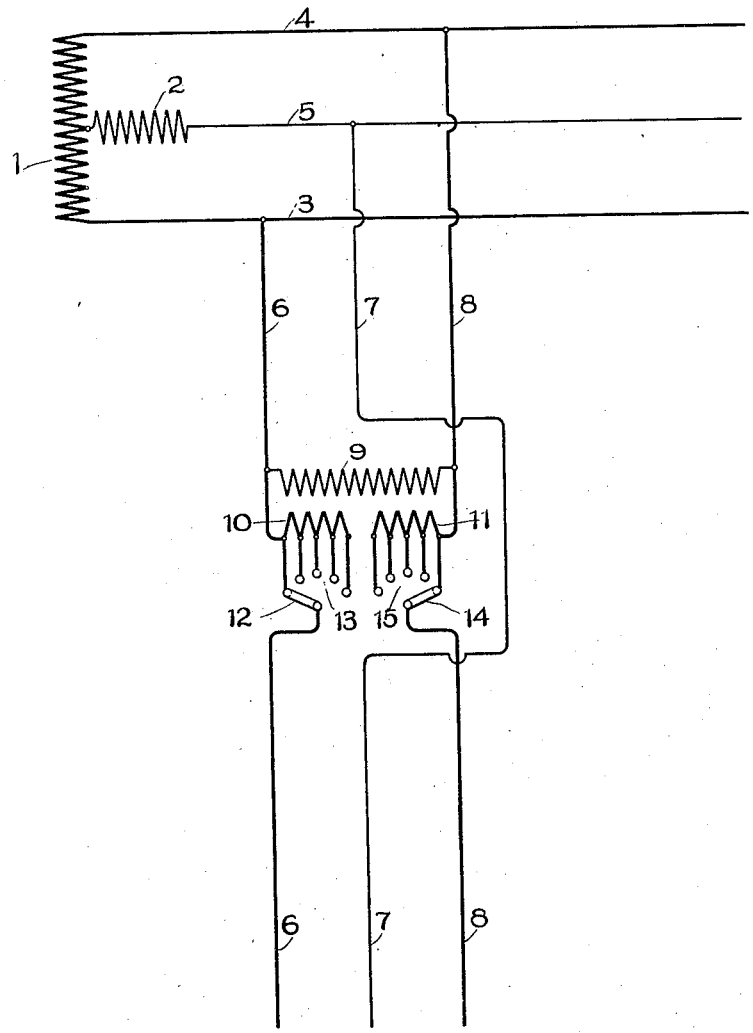
Witnesses:
Lewis H. Abell
Alexander S. Hunt
Inventor,
Walter S. Moody,
by Albert G. Davis
Atty

UNITED STATES PATENT OFFICE.

WALTER S. MOODY, OF SCHENECTADY, NEW YORK, ASSIGNOR TO THE GENERAL ELECTRIC COMPANY, OF NEW YORK.

ELECTRIC REGULATING DEVICE.

SPECIFICATION forming part of Letters Patent No. 654,663, dated July 31, 1900.

Application filed May 21, 1900. Serial No. 17,319. (No model.)

*To all whom it may concern:*

Be it known that I, WALTER S. MOODY, a citizen of the United States, residing at Schenectady, county of Schenectady, State of New York, have invented certain new and useful Improvements in Electric Regulating Devices, (Case No. 1,414,) of which the following is a specification.

My invention relates to means for regulating alternating currents, and is particularly useful in those systems of distribution in which it is necessary or desirable to vary the electromotive force in more than one conductor in order to secure the regulation sought for. The need for such a means for regulation is particularly marked in monocyclic systems of electric distribution now well known in the art. In such a system of distribution if the electromotive force of one of the main conductors of the system is changed without correspondingly changing that of the other main conductor then the voltages between the main conductors and the teaser-conductor are no longer symmetrical, but are distorted to an extent dependent upon the inequality of voltages measured between the main conductors and the point of connection of the teaser-winding to the main winding of the monocyclic generator or other machine connected to the system. My invention provides means for varying the voltages operating upon the respective main conductors of this and other systems, and in the embodiment of the invention, which I have hereinafter disclosed, I make use of regulating-coils placed, respectively, in series with the main conductors and inductively related to a common primary circuit. By this arrangement I avoid the inconvenience and expense attendant upon the use of separate regulators, and by consolidating the parts in one structure in the manner mentioned I am able to save space and to produce not only a cheaper but also a more efficient regulating apparatus than has heretofore been used.

My invention will better be understood by reference to the following description, taken in connection with the accompanying drawing, while its scope I will particularly point out in the claims appended hereto.

In the drawing I have illustrated my invention as applied to a monocyclic system of distribution. The main and teaser coils 1 2 are intended to represent a monocyclic alternating-current dynamo-electric machine such as is now well known in the art.

The main conductors of the system are indicated at 3 4, while the teaser-conductor is shown at 5. These conductors may be supposed to feed energy-consuming apparatus of any appropriate character, such as motors, lights, and the like. I have considered it unnecessary to illustrate the same in detail, since the novelty of my invention has no reference thereto. I have, however, shown mains 6 7 8 leading from the main distribution system and passing to translating devices. (Not shown.) To these mains or conductors I connect a regulating device consisting of a primary winding 9, having its terminals joined to the main conductors 6 8 of the monocyclic system, while two secondary windings 10 11, in inductive relation to the primary winding 9, are placed, respectively, in series with these main conductors 6 8. These secondary windings 10 and 11 are subdivided and are provided, respectively, with dial-switches having fixed contacts connected to points in the windings suitably displaced or separated from each other. Each dial-switch is provided with a moving contact-arm adapted to pass over the fixed contacts connected to the corresponding secondary winding. At 12 I have indicated such a switch-arm arranged in coöperative relation to fixed contacts 13, connected to the secondary winding 10, the switch-arm being electrically connected to an extension of the main 6. In a similar manner a switch-arm 14, connected to an extension of the main 8, is arranged in coöperative relation to a series of contacts 15, tapped into points in the secondary winding 11. The teaser-main 7 is brought forward without passing through the regulator and is extended along with the main conductors 6 and 8, with which it coöperates.

As is well known, the load between the main conductors of a monocyclic system consists principally of single-phase translating devices—such as incandescent lights, arc-lights, or the like—while multiphase devices when used are connected between the main conductors and the teaser-conductor as well.

In order to regulate the single-phase electromotive force acting between the main conductors of a monocyclic system without disturbing the symmetry of the multiphase electromotive forces acting in the system any more than is necessary, the potentials of both the main conductors must be changed, as has been before mentioned, since otherwise there will be produced an inequality of electromotive forces between the teaser-conductor and the respective main conductors. The regulating means above described is appropriate for such a mode of regulation and provides a cheap, efficient, and convenient means for securing the desired relation of electromotive forces.

What I claim as new, and desire to secure by Letters Patent of the United States, is—

1. A regulating device consisting of a single primary winding and a plurality of subdivided secondary windings in inductive relation to said primary winding.

2. The combination of two alternating-current mains, a primary winding connected across said mains, and two secondary windings in inductive relation to said primary winding, one of said secondary windings being arranged in series in one of said mains and the other secondary winding in series in the other main.

3. The combination of main conductors, a teaser-conductor upon which a phase-displaced electromotive force is maintained, and a regulating device consisting of coils in series with said main conductors and inductively related to a single primary circuit.

4. The combination of main conductors, a teaser-conductor upon which a phase-displaced electromotive force is maintained, and a regulating device consisting of coils in series with said main conductors and inductively related to a single primary circuit in shunt to said main conductors.

5. The combination of main conductors, a teaser-conductor upon which a phase-displaced electromotive force is maintained, and a regulating device consisting of adjustable coils in series with said main conductors and inductively related to a single primary circuit.

6. The combination with a monocyclic system of electric distribution, of regulating-windings for the main conductors, and a primary circuit in inductive relation to said regulating-windings.

7. The combination with a monocyclic system of electric distribution, of regulating-windings in series respectively with the main conductors, and a primary circuit in inductive relation to said regulating-windings.

In witness whereof I have hereunto set my hand this 19th day of May, 1900.

WALTER S. MOODY.

Witnesses:
BENJAMIN B. HULL,
MABEL E. JACOBSON.